United States Patent
Carella et al.

(10) Patent No.: US 11,084,922 B2
(45) Date of Patent: Aug. 10, 2021

(54) FLUOROPOLYMER COMPOSITION

(71) Applicant: SOLVAY SPECIALTY POLYMERS ITALY S.P.A., Bollate (IT)

(72) Inventors: Serena Carella, Parabiago (IT); Caterina Bocchia, Roccabianca (IT); Giulio Brinati, Milan (IT); Antonello Casale, Cremona (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 79 days.

(21) Appl. No.: 16/094,877

(22) PCT Filed: Apr. 14, 2017

(86) PCT No.: PCT/EP2017/059063
§ 371 (c)(1),
(2) Date: Oct. 18, 2018

(87) PCT Pub. No.: WO2017/182407
PCT Pub. Date: Oct. 26, 2017

(65) Prior Publication Data
US 2019/0127567 A1    May 2, 2019

(30) Foreign Application Priority Data
Apr. 19, 2016 (EP) .................................. 16166038

(51) Int. Cl.
C08L 27/12  (2006.01)
H01B 3/44   (2006.01)
(Continued)

(52) U.S. Cl.
CPC ............... *C08L 27/12* (2013.01); *B29B 9/06* (2013.01); *B29C 48/022* (2019.02);
(Continued)

(58) Field of Classification Search
CPC ......... Y10T 428/2933; Y10T 428/2938; Y10T 428/2947; G02B 6/443; G02B 6/4486;
(Continued)

(56) References Cited

U.S. PATENT DOCUMENTS 4,331,619 A   5/1982 Chung et al.
5,614,319 A   3/1997 Wessels et al.
(Continued)

OTHER PUBLICATIONS

Standard ASTM D792—Standard Test Methods for Density and Specific Gravity (Relative Density) of Plastics by Displacement, 2008, 6 pp.
(Continued)

*Primary Examiner* — Camie S Thompson
(74) *Attorney, Agent, or Firm* — Osha Bergman Watanabe & Burton LLP

(57) ABSTRACT

The invention pertains to a fluoropolymer composition [composition (C)] comprising:—at least one semi-crystalline polymer comprising recurring units derived from ethylene and at least one of chlorotrifluoroethylene (CTFE) and tetrafluoroethylene (TFE), said polymer having a heat of fusion of at most 35 J/g [polymer (A)]; and—from 0.05 to 15% by weight, based on weight of polymer (A), of at least one ethylene copolymer with at least one long chain a-olefin having a number of carbon atoms of 6 or more, and possessing a density of less than 0.900 g/cm3, as determined according to ASTM D792; to a method for its manufacture and to its use for manufacturing cables.

21 Claims, 2 Drawing Sheets

(51) Int. Cl.
  *C09D 127/12* (2006.01)
  *C08L 27/18* (2006.01)
  *C09D 127/18* (2006.01)
  *B29C 48/154* (2019.01)
  *B29C 48/00* (2019.01)
  *B29B 9/06* (2006.01)
  *C08J 3/20* (2006.01)
  *G02B 6/44* (2006.01)
  *H01B 13/14* (2006.01)
  *B29K 27/12* (2006.01)

(52) U.S. Cl.
  CPC ............ *B29C 48/154* (2019.02); *C08J 3/201* (2013.01); *C08L 27/18* (2013.01); *C09D 127/12* (2013.01); *C09D 127/18* (2013.01); *G02B 6/443* (2013.01); *G02B 6/4486* (2013.01); *H01B 3/441* (2013.01); *H01B 3/445* (2013.01); *H01B 13/148* (2013.01); *B29K 2027/12* (2013.01); *C08L 2203/206* (2013.01)

(58) Field of Classification Search
  CPC .... B29K 2027/12; H01B 3/441; H01B 3/445; H01B 13/148; C09D 127/18; C09D 127/12; C08L 23/0087; C08L 23/0892; C08L 23/06; C08L 23/14; C08L 23/0815; C08L 27/18; C08L 27/12; C08L 2203/206; C08J 2327/12
  USPC ........... 174/110 FC; 428/375, 278, 282, 378, 428/383; 525/199; 524/546
  See application file for complete search history.

(56) References Cited

U.S. PATENT DOCUMENTS

| | | |
|---|---|---|
| 6,335,490 B1 | 1/2002 | Higashikubo et al. |
| 9,441,087 B2 * | 9/2016 | Carella .................. C08K 3/014 |
| 2007/0078209 A1 | 4/2007 | Jozokos et al. |

OTHER PUBLICATIONS

Standard ASTM D3275—Standard Classification for E-CTFE-Fluoroplastic Molding, Extrusion, and Coating Materials, 2008 (reapprouved 2013), 4 pp.

* cited by examiner

FLUOROPOLYMER COMPOSITION

CROSS-REFERENCE TO RELATED APPLICATION

This application is a U.S. national stage entry under 35 U.S.C. § 371 of International Application No. PCT/EP2017/059063 filed Apr. 14, 2017, which claims priority to European application No. EP 16166038.6, filed Apr. 19, 2016. The entire contents of these applications are explicitly incorporated herein by this reference.

TECHNICAL FIELD

The present invention pertains to a fluoropolymer composition comprising a specific copolymer of ethylene and tetrafluoroethylene and/or chlorotrifluoroethylene, and including a certain amount of specific acid scavenger, so as to deliver outstanding processability and flexibility, while maintaining all fluoromaterial advantageous properties, and to the use thereof for the sheathing of cables.

BACKGROUND ART

ECTFE and ETFE have been extensively employed in several fields of use, thanks to their chemical resistance, wide continuous usage temperature range and thermal ageing resistance, good fire resistance with high limiting oxygen index, very low small molecules permeation, and excellent corrosion resistance.

These features have favoured notably the use of these materials in coating and lining applications, and more specifically as flexible polymeric electrical insulations for a variety of cables, including e.g. electrical cables, optical cables, LAN cables, and heating cables for electric heat tracing.

This latter technique is used notably to maintain or raise the temperature of pipes and vessels in the industry, but finds as well application in several other domains. Trace heating takes the form of an electrical heating element run in physical contact along the surface to be heated. Generally, electrical heating elements are composed by one or more than one conductive wire, embedded in a primary self-regulating conductive layer, surrounded by an inner jacket, further enveloped by a conductor braid for electrical grounding, and finally protected with an outer jacket, surrounding the entire assembly.

In this field of use, fluoromaterials have been considered as suitable candidates notably for inner and outer jacket, because of their corrosion resistance, flame retardancy and thermal rating and ageing resistance; nevertheless, ECTFE and ETFE, because of their crystalline character and high melting points may experience some processability issues and may compromise the flexibility of the overall electrical heating element, and/or be responsible for failures upon bending.

U.S. Pat. No. 4,331,619 (ALLIED CORP) May 25, 1982 discloses an ECTFE composition for extrusion foaming which comprises up to 3 phr of a polyolefin, in particular HDPE or PP, aiming at improving smoothness of the surface of the flexible extruded foam. The ECTFE polymer is defined as a copolymer including 40-60% moles of CTFE and 40-60% moles of E. In the working embodiments, use is made of an ECTFE copolymer comprising 49 to 51% moles of E.

U.S. Pat. No. 5,614,319 (COMMSCOPE INC) Mar. 25, 1997 is specifically focused on polyolefin/ECTFE or ETFE compositions for cable sheathing and insulation, either as solid or foamed insulator, for enhanced mechanical properties. ECTFE or ETFE polymers are thereby defined as copolymers consisting of 40-60% moles of E and 40-60% moles of TFE or CTFE. The polyolefin can be polyethylene (including HDPE, LDPE, MDPE, LLDPE, . . . ), polypropylene and EPR (ethylene/propylene rubbers. In the examples, mixtures of ECTFE with variable amounts (from 10 to 25% wt) of different polyolefins (HDPE, PP, LLDPE) having densities of greater than 0.945 (HDPE), or below 0.930 (LLDPE) are described.

US 2007078209 (ALPHAGARY CORP) Apr. 5, 2007 relates to compositions for cable sheathing including a fluoropolymer (which is preferably one of PVDF, ECTFE and ETFE), a char forming agent and a compatibilizer agent. The said compatibilizer agent is added in an amount of 0.1 to 5% wt in effective amounts to promote adhesion and better dispersion of char forming agent. This compatibilizer can be an olefin copolymer, such as linear and branched polyethylenes, including HDPE and thermoplastic elastomers, polypropylene and polymethylpentene, siloxane/polyetherimide copolymers, styrene/ethylene/butadiene/styrene (SEBS) thermoplastic elastomers and the like.

While efforts for improving properties of fluoropolymers compositions based on ETFE or ECTFE have been recorded in the art, there remains nevertheless a continuous quest in this field for fluoropolymer compositions delivering an improved properties' compromise, including maintaining corrosion resistance, flame retardancy, thermal rating and ageing resistance typical of fluoromaterials, while enhancing processability, flexibility and bending ability so as to be more adapted for use in cable sheathing applications, and more specifically for electrical heating.

SUMMARY OF INVENTION

It is thus an object of the invention a fluoropolymer composition [composition (C)] comprising:

at least one semi-crystalline polymer comprising recurring units derived from ethylene and at least one of chlorotrifluoroethylene (CTFE) and tetrafluoroethylene (TFE), said polymer having a heat of fusion of at most 35 J/g [polymer (A)]; and from 0.05 to 15% by weight, based on weight of polymer (A), of at least one ethylene copolymer with at least one long chain α-olefin having a number of carbon atoms of 6 or more, and possessing a density of less than 0.900 g/cm$^3$, as determined according to ASTM D792 [polymer (O)].

The Applicant has surprisingly found that the composition as above detailed possesses an outstanding set of properties, including ability to be processed easily and to provide extruded sheathing having excellent surface properties, very good thermal resistance and ageing performances, and an improved flexibility, with tensile strength values of less than 1000 MPa, while still possessing homogeneous composition, and substantial homogeneity in properties throughout the bulk of the material.

Yet another object of the invention is a method of making the fluoropolymer composition as above detailed.

Still, the invention pertains to a cable comprising at least one component comprising the fluoropolymer composition, as above detailed.

Finally, the invention pertains to a method of manufacturing a cable, as above detailed, including using the fluoropolymer composition, as above detailed.

DESCRIPTION OF EMBODIMENTS

Figure 1:
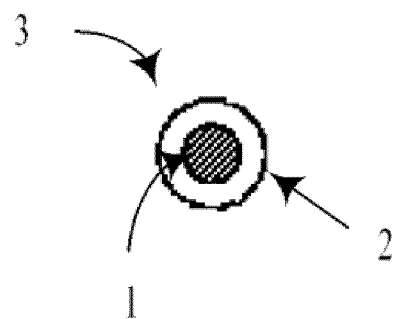
FIG. 1 is a sketch of an insulated conductor comprising a primary insulation sheath made from the fluoropolymer composition of the invention.

The fluoropolymer composition of the invention comprises one or more than one polymer (A), as above detailed.

The heat of fusion of polymer (A) is determined by Differential Scanning Calorimetry (DSC) at a heating rate of 10° C./min, according to ASTM D 3418.

Polymer (A) possesses a heat of fusion of at most 35 J/g, preferably of at most 30 J/g, more preferably of at most 25 J/g.

The above detailed upper boundaries for the heat of fusion of polymer (A) are such to characterize the polymer (A) in relation to its low crystallinity, or in other words, the presence of a significant portion of amorphous phase, in addition to the crystalline phase.

Nevertheless, it is essential for polymer (A) of being a semi-crystalline polymer, i.e. a polymer having a detectable melting point when determined according to ASTM D 3418.

Without lower limit for heat of fusion being critical, it is nevertheless understood that polymer (A) will generally possess a heat of fusion of at least 1 J/g, preferably of at least 2 J/g, more preferably of at least 5 J/g.

It is well known in the art that 50/50 mol/mol ECTFE or ETFE copolymers show a maximum of crystallinity, i.e. of both melting point and heat of fusion.

The requirement for a heat of fusion of at most 35 J/g can thus be achieved either by increasing or by decreasing the amount of ethylene with respect to this 50/50 molar ratio.

It is nevertheless understood that polymers (A) which are preferred for the purpose of the invention are indeed those comprising an amount of recurring units derived from ethylene of less than 45% moles, preferably of less than 43% moles, more preferably of less than 42% moles, as they enable achieving improved properties due to the fluoromonomer components.

Polymer (A) of the composition (C) of the invention typically comprise:

(a) recurring units derived from of ethylene (E) in an amount ranging from 30 to 45%, preferably from 35 to 43% by moles, with respect to the total amount of recurring units;

(b) recurring units derived from at least one of chlorotrifluoroethylene (CTFE), tetrafluoroethylene (TFE) or mixture thereof, in an amount ranging from 55 to 70%, preferably from 57 to 65% by moles, with respect to the total amount of recurring units; and (c) wherein from 0 to 3%, preferably from 0 to 2% by moles, based on the total amount of recurring units, of recurring units (b) may be replaced by recurring units derived from one or more fluorinated and/or hydrogenated comonomer(s).

Embodiments wherein polymer (A) essentially consists of recurring units (a), (b) and optionally (c), and preferably of recurring units (a) and (b), as above detailed, are generally preferred. End chain, defects and minor amounts of monomer impurities leading to recurring units different from those above mentioned (typically, <0.1% moles, with respect to the total amount of recurring units) may be tolerated, without these substantially affecting the properties of polymer (A).

When the polymer (A) comprises recurring units (c), the comonomer is generally a hydrogenated comonomer selected from the group of the (meth)acrylic monomers. More preferably the hydrogenated comonomer is selected from the group of the hydroxyalkylacrylate comonomers, such as hydroxyethylacrylate, hydroxypropylacrylate and (hydroxy)ethylhexylacrylate, and alkyl acrylate comonomers, such as n-butyl acrylate.

Among polymers (A), ECTFE copolymers, i.e. copolymers of ethylene and CTFE and optionally a third monomer, as above detailed, and even more copolymers of ethylene and CTFE are preferred.

ECTFE polymers suitable in the composition of the invention typically possess a melting temperature not exceeding 210° C., preferably not exceeding 200° C., even not exceeding 198° C., preferably not exceeding 195° C., more preferably not exceeding 193° C., even more preferably not exceeding 190° C. The ECTFE polymer has a melting temperature of advantageously at least 120° C., preferably of at least 130° C., still preferably of at least 140° C., more preferably of at least 145° C., even more preferably of at least 150° C.

The melting temperature is determined by Differential Scanning Calorimetry (DSC) at a heating rate of 10° C./min, according to ASTM D 3418.

ECTFE polymers which have been found to give particularly good results are those consisting essentially of:

(a) recurring units derived from ethylene (E) in an amount of 40 to 43% by moles;

(b) recurring units derived from chlorotrifluoroethylene (CTFE) in an amount of 57 to 60% by moles, with respect to the total amount of recurring units.

End chains, defects or minor amounts of monomer impurities leading to recurring units different from those above mentioned (typically, <0.1% moles, with respect to the total amount of recurring units) can be still present in the preferred ECTFE, without this affecting properties of the material.

The melt flow rate of the ECTFE polymer, measured following the procedure of ASTM 3275-81 at 230° C. and 2.16 Kg, ranges generally from 0.01 to 75 g/10 min, preferably from 0.1 to 50 g/10 min, more preferably from 0.5 to 30 g/10 min.

The composition (C) of the invention advantageously comprises polymer (A) as major polymer component; generally the amount of polymer (A) is of at least 55% wt, preferably of at least 60% wt, more preferably at least 70% wt, with respect to the total weight of the composition.

The composition (C) comprises one or more than one ethylene copolymer with at least one long chain α-olefin having a number of carbon atoms of 6 or more, and possessing a density of less than 0.900 g/cm³, as determined according to ASTM D792, referred to hereunder as polymer (O).

The polymer (O) possesses a density of less than 0.900 g/cm³, preferably of less than 0.890 g/cm³, more preferably of less than 0.880 g/cm³, and even more preferably of less than 0.870 g/cm³, as determined according to ASTM D792.

These upper boundaries for density of polymer (O) are representative of an ethylene copolymer possessing very low density, i.e. having low crystallinity and a substantial elastomeric behaviour.

Lower boundary for the polymer (O) is not particularly critical, and it is generally such that polymer (O) possesses a density of more than 0.800 g/cm$^3$, preferably of more than 0.830 g/cm$^3$, more preferably of more than 0.840 g/cm$^3$.

As said, polymer (O) is an ethylene copolymer with at least one long chain α-olefin having a number of carbon atoms of 6 or more.

It is hence understood that polymer (O) is hence distinguishable from ethylene copolymers comprising recurring units derived from monomers different from the α-olefin having a number of carbon atoms of 6 or more, as defined above.

In other terms, the polymer (O) essentially consists of recurring units derived from ethylene and from at least one α-olefin having a number of carbon atoms of 6 or more. End chain, defects and minor amounts of monomer impurities leading to recurring units different from those above mentioned (typically, <0.1% moles, with respect to the total amount of recurring units) may be tolerated, without these substantially affecting the properties of polymer (O).

The α-olefin having a number of carbon atoms of 6 or more of polymer (O) is generally selected from the group consisting of linear α-olefin having terminal ethylenically unsaturated double bond, e.g. 1-hexene, 1-octene, 1-decene, 1-dodecene, 1-tetradecene, 1-hexadecene, 1-octadecene.

Particularly good results were obtained for composition (C) wherein the polymer (O) is an ethylene copolymer with 1-octene.

The composition (C) of the invention comprises polymer (O) in an amount of generally at least 1% wt., preferably at least 2% wt., more preferably at least 3% wt., and of generally at most 15% wt., preferably at most 14% wt., more preferably at most 13% wt. with respect to the weight of polymer (A).

The composition (C) may comprise, in addition to polymer (A) and polymer (O), at least one additional ingredient, including notably reinforcing fillers, stabilizers including UV stabilizers, and thermal stabilizers, lubricants, processing aids, mold release agents, and the like.

The composition (C) generally consists essentially of polymer (A), polymer (O) and, optionally, one or more of the ingredients listed above.

The invention further concerns a method of making the composition (C) as above detailed, said method comprising generally melt compounding polymer (A) and polymer (O), as above detailed.

Polymer (A) and polymer (O) may be melt compounded in compounding devices which are known for the processing of fluoropolymer thermoplast. Generally, polymer (A) and polymer (O) will be compounded in melt extruders. In such case, the composition (C) will be provided under the form of pellets for being further processed.

The composition (C) of the present invention advantageously possesses a Tensile Modulus, determined at 23° C. according to ASTM D638, of less than 1000 MPa, preferably less than 900 MPa, more preferably less than 800 MPa. The composition (C) of the invention advantageously possesses a Tensile Modulus, determined as specified above, of at least 500 MPa, preferably at least 600 MPa.

The composition (C) of the present invention advantageously possesses a strain at break, determined at 23° C. according to ASTM D638, of at least 200%, preferably at least 250%, more preferably at least 300%. The composition (C) of the invention advantageously possesses a strain at break, determined as specified above, of at most 500%, preferably at most 400%.

The invention further pertains to a cable comprising a component comprising the fluoropolymer composition, as above detailed.

Said component made from the composition (C) may include a jacket, a primary insulation sheath, and may include various sub-components such as a shield tape, a strength member, crossweb, film, buffer, separator, pull cord, sub-jacket, all well known in the industry, any one or more of which may be made or otherwise may comprise the composition (C) of the invention.

Preferably, the cable of the invention comprises at least one component selected from the group consisting of primary insulation sheaths and jackets, made of the fluoropolymer composition, as above detailed.

Preferred cables according to the invention are insulated wire, communication cables, electrical heating elements and optical cables.

FIG. 1 is a section view of an insulated cable comprising a primary insulation sheath made from the fluoropolymer composition, according to a first embodiment of the invention. The insulated wire (3) of FIG. 1 comprises an optic fiber (1) or a metal conductor wire (1), generally aluminum or copper, preferably copper, surrounded by a primary insulation sheath (2) made from the fluoropolymer composition of the present invention. Preferred cables of this embodiment are insulated wires comprising a metal conductor wire.

The primary insulation sheath (2) can be advantageously obtained by extruding fluoropolymer composition, as above detailed, using a tubing (including semi-tubing) technique which involves a crosshead assembly and a tip and die configuration that contains flow channels designed to maximize the uniformity of the coating on the central conductor wire or optic fiber. A tube of the fluoropolymer composition of the invention is advantageously extruded around and spaced from the conductor wire or the optic fiber, and said tube is advantageously extruded such that the thickness of the fluoropolymer composition is reduced or drawn down before it contacts the conductor wire or the optic fiber. A vacuum is advantageously provided between the conductor wire or the optic fiber and the fluoropolymer composition being extruded under the form of a tube, thereby causing atmospheric pressure to progressively press said extruded tube of fluoropolymer composition into contact with the conductor wire or with the optic fiber.

As an alternative, application of the fluoropolymer composition through means of pressure extrusion technique may also be suitable. In pressure extrusion, fluoropolymer composition can be fed to an extruder, wherein the conductor wire is advantageously brought into contact with molten fluoropolymer composition within the crosshead die to form the coating directly onto the conductor wire or the optic fiber. According to this embodiment, no pre-formed tube of fluoropolymer composition is extruded.

Figure 2:
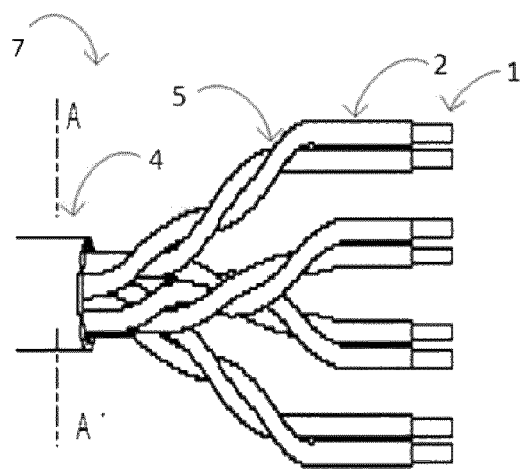
FIG. 2 is a side view, with parts broken away, of a communication cable comprising a plurality of conductors.

FIG. 2 is a side view, with parts broken away, of a communication cable (7) according to a second embodiment of the invention. The electrical cable embodiment of the invention illustrated in FIG. 2 generally comprises a plurality of individual electrical conductors, which each comprises a conductor wire (1) and a primary insulation sheath (2) so that they are electrically insulated from one another. Pairs of said wires are generally twisted into a bundle (5) and several bundles are held together by jacket (4). Both jacket (4) and primary insulation sheath (2) can comprise the composition or the foamed insulation as above detailed.

Jacket (4) can be similarly formed by extrusion either by tubing extrusion technique or by pressure extrusion technique, as above described for the primary insulation sheath, being understood that the conductor wire or the optical fiber will be replaced in this embodiment by an insulated conductor or insulated fiber or assembly thereof.

In communication cables, four pairs of insulated wires are generally twisted together and said twisted pairs (5) are typically held together by jacket (4).

Any one or more of jacket (4) and primary insulation sheaths (2) can be made of the fluoropolymer composition as above detailed.

Figure 3:
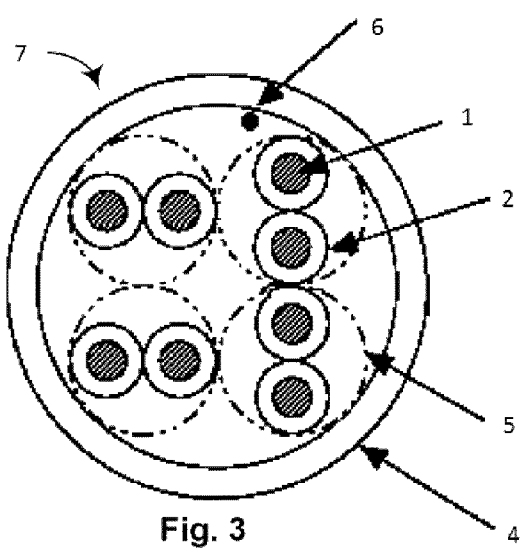
FIG. 3 is a cross-sectional view along A-A' plane (see FIG. 2) of the communication cable of FIG. 2.

FIG. 3 is a cross-sectional view along A-A' plane (see FIG. 2) of the communication cable (7) according to the second embodiment of the invention the invention. A ripcord (6) can be present.

According to another embodiment of the invention, the cable is an optical cable (not shown). In an optical cable according to the invention, the conductor wire is replaced by glass optical fiber strands. Thus, a typical construction of an optical cable according to the invention comprises a plurality of groups of glass fiber optic strands wrapped around another glass strand or a coated steel wire or core, each of said groups being surrounded by a primary sheathing, and said plurality of groups being surrounded by a jacket. Equally in this case, the primary sheathing and/or the jacket can be made of the fluoropolymer composition as above detailed.

Figure 4:
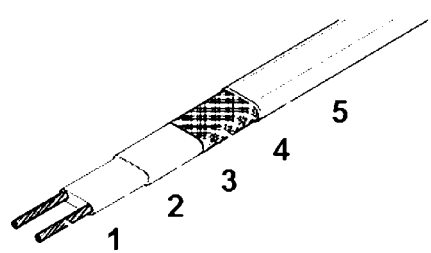
FIG. 4 depicts an electrical heating element comprising conductive wires.

According to yet another embodiment, the cable is an electrical heating element. An exemplary embodiment of an electrical heating element is depicted in FIG. 4. FIG. 1 shows an electrical heating element comprising conductive wires (1), embedded in a primary self-regulating conductive layer (2), surrounded by an inner jacket (3), further enveloped by a conductor braid for electrical grounding (4), and finally protected with an outer jacket (5), surrounding the entire assembly. Inner jacket (3) and/or outer jacket (5) may be made from the fluoropolymer composition of the invention. It is yet encompassed by the present invention for the fluoropolymer composition to be used as base material to be compounded with an appropriate conductive additive, so as to provide for construction material for the primary self-regulating conducting layer (2).

Finally, the invention pertains to a method of manufacturing a cable, as above detailed, including using the fluoropolymer composition as above detailed.

When the component comprising the fluoropolymer composition is any of primary insulation sheath and jacket, the method of the invention will comprise using fluoropolymer composition in any of tubing extrusion technique and pressure extrusion technique, as advantageously described above.

Should the disclosure of any patents, patent applications, and publications which are incorporated herein by reference conflict with the description of the present application to the extent that it may render a term unclear, the present description shall take precedence.

The invention will be now described in more detail with reference to the following embodiments whose purpose is merely illustrative and not intended to limit the scope of the present invention.

EXAMPLES

Raw Material

Polymers

Polymer (A-1): is a $41/59$ mole % E/CTFE copolymer having a melting point (Tm2) of 180° C., a heat of fusion (ΔH2f) of about 18 J/g and a MFI of 1.4 g/10 min (230° C./2.16 kg).

Polymer (B-1): is a 50/50 mole % ethylene/chlorotrifluoroethylene (E/CTFE) copolymer commercially available under trade name HALAR® 300 having a melting point (Tm2) of 242° C. and a heat of fusion (ΔH2f) of 42 J/g and a MFI of 1.8 g/10 min (275° C./2.16 kg).

Polymer (O-1): is an ultra-low density ethylene-octene copolymer commercialized as Engage® ULDPE 8842 by Dow, possessing a density of 0.857 g/cm³, when determined according to ASTM D792.

General Manufacturing Procedure of Melt Compounded

A composition comprising was manufactured by mixing the polymer (A-1) in the form of pellets, and polymer (O-1) in form of pellets in molten phase by extrusion using a twin screw extruder equipped with 11 temperature zones thereby providing pellets of composition (1) according to the invention (polymer (O-1) content: 10% wt) or of composition (3c) of comparison (polymer (O-1) content: 20% wt).

Processing set points were set as in Table 1 hereinbelow:

TABLE 1

| T1-2 | T3 | T4-5 | T6-7 | T8 | T9 | T10-11 |
|---|---|---|---|---|---|---|
| 170° C. | 175° C. | 180° C. | 190° C. | 200° C. | 210° C. | 235° C. |

Screws speed was set at 150 rpm, with a torque of 52%, so as to yield a throughput rate of about 20 kg/h, and a melt extrudate temperature of 235° C. Extruded strands were cooled in a water bath, dried, calibrated and cut in a pelletizer.

A composition comprising the polymer (B-1) in the form of pellets, and polymer (O-1) in form of pellets was processed in molten phase by extrusion preferably using a twin screw extruder equipped with 11 temperature zones thereby providing the composition (2c) of comparison in the form of pellets.

Processing set points were set as in Table 2 herein below:

TABLE 2

| T1-2 | T3 | T4-5 | T6-7 | T8 | T9 | T10-11 |
|---|---|---|---|---|---|---|
| 220° C. | 225° C. | 230° C. | 240° C. | 250° C. | 260° C. | 265° C. |

Screws speed was set at 150 rpm, with a torque of 50%, so as to yield a throughput rate of about 20 kg/h, and a melt extrudate temperature of 264° C. Extruded strands were cooled in a water bath, dried, calibrated and cut in a pelletizer.

General Procedure for the Manufacture of Molded Plaques

Molded plaques made of each of compositions 1 and 2c were obtained by compression molding at the following conditions:

Temperature: 230° C. for composition of Ex. 1 and 275° C. for composition of Ex. 2c;

Time: 5'+1'+1' (preheating, degassing, molding);

Pressure: 16.000 kg;

Cooling: fast in cold water plates press @16.000 Kg;

Substrate: KAPTON® polyimide film

Characterization of Material

Molded plaques obtained as above detailed were submitted to mechanical testing, according to ASTM D638 (type V) at 23° C. The results set forth in Table 3 herein below show that molded articles obtained from the composition (1) according to the invention advantageously exhibited a lower tensile modulus and a higher elongation at break as compared with the molded articles obtained from the composition (2c) of comparison.

TABLE 3

| Composition | Polymer (type) | Polymer (O-1) (% wt) | Modulus [MPa] | Strain @ Break [%] |
|---|---|---|---|---|
| Ex. 1 | A-1 | 10 | 770 (11) | 323 (3) |
| Ex. 2c | B-1 | 10 | 1078 (28) | 183 (16) |

Between brackets, standard deviation values are provided; low values of standard deviation, as exhibited by composition of Ex. 1 (but not by composition of Ex. 2c of comparison) are an additional evidence of a material possessing high homogeneity.

Additional mechanical properties data are summarized in Table 4 below, regarding compounds including variable amounts of polymer (O-1) as above detailed.

The results set forth in Table 4 herein below have shown that molded articles obtained from the composition (1) according to the invention advantageously exhibited higher elongation at break as compared with the molded articles obtained from the composition of Ex. 3c of comparison (with higher amount of polymer O).

TABLE 4

| Composition | Polymer (type) | Polymer (O-1) (% wt) | Modulus [MPa] | Strain @ Break [%] |
|---|---|---|---|---|
| Ex. 1 | A-1 | 10 | 770 (11) | 323 (3) |
| Ex. 3c | A-1 | 20 | 496 (27) | 59 (47) |

The higher values of standard deviation for both modulus and strain at break (values between brackets) as observed in Ex. 3c are representative of dishomogeneous mixtures, and clearly demonstrate the criticality of maintaining amount of polymer (O-1) below 15% wt, with respect to the host polymer.

The invention claimed is:

1. A fluoropolymer composition (C) comprising:
   at least one polymer (A), wherein polymer (A) is a semi-crystalline polymer comprising:
      recurring units derived from ethylene and
      recurring units derived from at least one of chlorotrifluoroethylene (CTFE) and tetrafluoroethylene (TFE),
   said polymer (A) having a heat of fusion of at most 30 J/g; and
   from 0.05 to 15% by weight, based on weight of polymer (A), of at least one polymer (O), wherein polymer (O) is an ethylene copolymer with at least one long chain α-olefin having a number of carbon atoms of 6 or more, and possessing a density of less than 0.900 g/cm$^3$, as determined according to ASTM D792.

2. The fluoropolymer composition (C) of claim 1, wherein polymer (A) is an ECTFE polymer consisting essentially of:
   (a) recurring units derived from ethylene (E) in an amount of 40 to 43% by moles;
   (b) recurring units derived from chlorotrifluoroethylene (CTFE) in an amount of 57 to 60% by moles, with respect to the total amount of recurring units.

3. The fluoropolymer composition (C) of claim 2, wherein the melt flow rate of the ECTFE polymer, measured following the procedure of ASTM 3275-81 at 230° C. and 2.16 Kg, ranges from 0.01 to 75 g/10 min.

4. The fluoropolymer composition (C) of claim 3, wherein the melt flow rate of the ECTFE polymer, measured following the procedure of ASTM 3275-81 at 230° C. and 2.16 Kg, ranges from 0.5 to 30 g/10 min.

5. The fluoropolymer composition (C) according to claim 1, which comprises polymer (A) as major polymer component, or wherein the amount of polymer (A) is of at least 55% wt, with respect to the total weight of the composition.

6. The fluoropolymer composition (C) according to claim 5, wherein the amount of polymer (A) is of at least 70% wt, with respect to the total weight of the composition.

7. The fluoropolymer composition (C) according to claim 1, comprising one or more than one polymer (O) possessing a density of less than 0.890 g/cm$^3$, as determined according to ASTM D792.

8. The fluoropolymer composition (C) according to claim 7, comprising one or more than one polymer (O) possessing a density of less than 0.870 g/cm$^3$, as determined according to ASTM D792.

9. The fluoropolymer composition (C) according to claim 1, wherein the α-olefin having a number of carbon atoms of 6 or more is selected from the group consisting of linear α-olefins having terminal ethylenically unsaturated double bond.

10. The fluoropolymer composition (C) according to claim 9, wherein the α-olefin having a number of carbon atoms of 6 or more is selected from the group consisting of 1-hexene, 1-octene, 1-decene, 1-dodecene, 1-tetradecene, 1-hexadecene and 1-octadecene.

11. The fluoropolymer composition according to claim 1, wherein polymer (O) is an ethylene copolymer with 1-octene.

12. The fluoropolymer composition according to claim 1, said composition (C) comprising polymer (O) in an amount of at least 1% wt. and of at most 14% wt. with respect to the weight of polymer (A).

13. The fluoropolymer composition according to claim 12, said composition (C) comprising polymer (O) in an amount of at least 3% wt and of at most 13% wt, with respect to the weight of polymer (A).

14. A method of making the fluoropolymer composition (C) according to claim 1, said method comprising melt compounding polymer (A) and polymer (O).

15. The method of claim 14, wherein polymer (A) and polymer (O) are compounded in melt extruders.

16. A cable comprising a component comprising the fluoropolymer composition according to claim 1.

17. The cable of claim 16, wherein said component is selected from the group consisting of a jacket, a primary insulation sheath, a sub-component, a shield tape, a strength member, a crossweb, a film, a buffer, a separator, a pull cord, a sub-jacket.

18. The cable of claim 16, said cable comprising at least one component made of the fluoropolymer composition (C), wherein the component is selected from the group consisting of primary insulation sheaths and jackets.

19. The cable according to claim 16, said cable being selected from the group consisting of insulated wires, communication cables, electrical heating elements and optical cables.

20. A method of manufacturing a cable, said method comprising:
    tubing extruding or pressure extruding including using the fluoropolymer composition (C) of claim 1 to form a component of said cable, wherein the component is a primary insulation sheath, a jacket or both.

21. The fluoropolymer composition according to claim 1, wherein polymer (A) has a heat of fusion of at most 25 J/g.

* * * * *